US008136246B2

(12) United States Patent
So

(10) Patent No.: US 8,136,246 B2
(45) Date of Patent: Mar. 20, 2012

(54) METHOD FOR FORMING AN EJECTION HOLE IN AN EMITTING PIPE

(76) Inventor: Jae-Yong So, Guro-gu (KR)

(*) Notice: Subject to any disclaimer, the term of this patent is extended or adjusted under 35 U.S.C. 154(b) by 1085 days.

(21) Appl. No.: 12/023,699

(22) Filed: Jan. 31, 2008

(65) Prior Publication Data

US 2008/0190256 A1 Aug. 14, 2008

(30) Foreign Application Priority Data

Feb. 14, 2007 (KR) ........................ 10-2007-0015446

(51) Int. Cl.
*B23P 17/00* (2006.01)
*B05B 15/00* (2006.01)

(52) U.S. Cl. ............. 29/890.09; 29/890.11; 29/890.124; 239/542; 239/11

(58) Field of Classification Search ............... 29/890.09, 29/890.1, 890.11, 890.124; 239/542, 547, 239/11
See application file for complete search history.

(56) References Cited

U.S. PATENT DOCUMENTS

| | | | | |
|---|---|---|---|---|
| 6,371,390 | B1 * | 4/2002 | Cohen | 239/542 |
| 6,581,854 | B2 * | 6/2003 | Eckstein et al. | 239/542 |
| 6,886,761 | B2 * | 5/2005 | Cohen | 239/542 |
| 7,175,113 | B2 * | 2/2007 | Cohen | 239/542 |
| 7,681,805 | B2 * | 3/2010 | Belford et al. | 239/11 |
| 2006/0162867 | A1 * | 7/2006 | Kertscher et al. | 156/498 |

FOREIGN PATENT DOCUMENTS

| | | | |
|---|---|---|---|
| CN | 1640236 | A | 7/2005 |
| EP | 1541013 | A1 * | 6/2005 |
| KR | 1020050122084 | A | 12/2005 |

* cited by examiner

*Primary Examiner* — Sarang Afzali
(74) *Attorney, Agent, or Firm* — Kile Park Goekjian Reed & McManus PLLC

(57) ABSTRACT

An emitting pipe boring method, for forming an ejection hole on a drip pressure reducing hose above a discharging portion of at least one drip which is adhered to an inside of the drip pressure reducing hose and includes an introducing portion, a pressure reducing portion and a discharging portion, includes a first step for forming an upward projection to be higher than a height of the drip at the discharging portion of the drip, a second step for forming a protruding portion on the drip pressure reducing hose by the upward projection of the drip when the drip is adhered to the inside of the drip pressure reducing hose, and a third step for forming an ejection hole of the drip pressure reducing hose by horizontally cutting an upper portion of the protruding portion formed on the drip pressure reducing hose through the second step.

3 Claims, 8 Drawing Sheets

METHOD FOR FORMING AN EJECTION HOLE IN AN EMITTING PIPE

BACKGROUND OF THE INVENTION

1. Field of the Invention

The present invention relates to an emitting pipe, and more particularly to an emitting pipe boring method capable of easily and accurately punching an ejection hole of a tube on a discharging portion of a pressure reducing drip regardless of a variation in a distance between pressure reducing drips and an emitting pipe with a hole formed by the same.

2. Description of the Related Art

As known well, an emitting pipe has a number of ejection holes formed on a drip pressure reducing hose such that water flowing in the drip pressure reducing hose can be ejected through the ejection holes. As shown in FIG. 8, a number of pressure reducing drips 2 are attached to the inside of the drip pressure reducing hose at specified intervals. The pressure of water flowing in a drip pressure reducing hose 1 is reduced by the pressure reducing drips 2 such that the pressure of water flowing in leading and rear portions of the drip pressure reducing hose is made to be uniform.

As shown in FIG. 9, each of the pressure reducing drips 2 includes an introducing portion 21 for introducing water into the drip, a pressure reducing portion 22 for reducing the pressure of the introduced water, and a discharging portion 23 for discharging the water with a reduced pressure to the outside. The discharging portion 23 is positioned below an ejection hole 11 of the drip pressure reducing hose 1.

The emitting pipe is generally manufactured by an apparatus shown in FIG. 10. The apparatus for manufacturing an emitting pipe includes a drip pressure reducing hose molding unit 3 which has a sizing portion 3*a* for melting resin to form the drip pressure reducing hose 1; a drip supply unit 4 which supplies drips toward the drip pressure reducing hose molding unit 3; a cooling unit 5 which cools the drip pressure reducing hose 1 that is molded by the drip pressure reducing hose molding unit 3 by passing it through water; a first drawing portion 6 and a second drawing portion 6*a* which draw an end of the drip pressure reducing hose 1 that has passed through the cooling unit 5 at a specified velocity; and a boring unit 7 which is disposed between the first drawing portion 6 and the second drawing portion 6*a* to bore an ejection hole on the drip pressure reducing hose 1.

Further, the boring unit 7 includes a rail 71 which supports a lower portion of the drip pressure reducing hose 1 moving as shown in FIG. 11, and a rotation punch 72 which is installed on the upper side of the rail 71 to rotate at a specified velocity by a driving motor 72*a* and is mounted with a number of punches 72*b* disposed on the outside of the rotation punch 72 at equal intervals.

Further, the rotation punch 72 is operated according to detection signals transmitted from a drip projection detecting unit 8 positioned at the front side in a moving direction of the drip pressure reducing hose. For this operation, a circumferential distance L1 between the punches 72*b* mounted on the rotation punch 72 at equal intervals is formed relatively larger than a distance L2 between positions of the drip projection detecting unit 8 and the rotation punch 72. Reference numerals 60 and 60*a* denote upper and lower drawing rolls.

However, in the conventional emitting pipe boring apparatus, a circumferential distance between the punches, a distance between the drip projection detecting unit and the rotation punch and a moving velocity of the drip pressure reducing hose should be accurately set in order to bore an ejection hole at an accurate position of the drip pressure reducing hose, that is, a position of the discharging portion of the drip. Accordingly, trouble and inconvenience due to difficulty in the operation cause inefficiency of the operation, a material loss due to a high defect ratio, and a reduction of economical efficiency.

SUMMARY OF THE INVENTION

Therefore, the present invention has been made in view of the above problems, and it is an object of the present invention to easily and accurately bore an ejection hole of a tube on a discharging portion of a pressure reducing drip regardless of a variation in an interval between the pressure reducing drips.

In accordance with an aspect of the present invention, there is provided an emitting pipe boring method for forming an ejection hole on a drip pressure reducing hose above a discharging portion of at least one drip which is adhered to an inside of the drip pressure reducing hose and includes an introducing portion, a pressure reducing portion and a discharging portion, the method comprising: a first step for forming an upward projection to be higher than a height of the drip at the discharging portion of the drip; a second step for forming a protruding portion on the drip pressure reducing hose by the upward projection of the drip when the drip is adhered to the inside of the drip pressure reducing hose; and a third step for forming an ejection hole of the drip pressure reducing hose by horizontally cutting an upper portion of the protruding portion formed on the drip pressure reducing hose through the second step.

Preferably, the drip is configured as one drip body including the introducing portion, the pressure reducing portion and the discharging portion and includes a number of drips which are adhered to the inside of the drip pressure reducing hose at specified intervals.

Preferably, the drip is configured as a pressure reducing strip drip in which respective groups each consisting of the introducing portion, the pressure reducing portion and the discharging portion are successively formed on a strip-shaped drip body to be adhered to the inside of the drip pressure reducing hose.

In accordance with another aspect of the present invention, there is provided an emitting pipe boring method for forming an ejection hole on a drip pressure reducing hose above a discharging portion of at least one drip which is adhered to an inside of the drip pressure reducing hose and includes an introducing portion, a pressure reducing portion and a discharging portion, the method comprising: a first step for forming an upper projection having the same height as the drip and a lower projection of a lower side of the upper projection at the discharging portion of the drip; a second step for forming a protruding portion on the drip pressure reducing hose by the upward projection by adhering the drip having the upper and lower projections to the inside of the drip pressure reducing hose, and moving the lower projection upward due to a lower surface of the drip pressure reducing hose when upper and lower portions of the drip pressure reducing hose overlap with each other; and a third step for forming an ejection hole of the drip pressure reducing hose by horizontally cutting an upper portion of the protruding portion formed on the drip pressure reducing hose through the second step.

Preferably, the drip is configured as one drip body including the introducing portion, the pressure reducing portion and the discharging portion and includes a number of drips which are adhered to the inside of the drip pressure reducing hose at specified intervals.

Preferably, the drip is configured as a pressure reducing strip drip in which respective groups each consisting of the introducing portion, the pressure reducing portion and the discharging portion are successively formed on a strip-shaped drip body to be adhered to the inside of the drip pressure reducing hose.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates a perspective view showing a first step of the present invention;

FIG. 2 illustrates a cross-sectional view showing a second step of the present invention;

FIG. 3 illustrates a cross-sectional view showing a third step of the present invention;

FIG. 4 illustrates a plan view showing a state where an ejection hole is formed on a drip pressure reducing hose through the above steps;

FIGS. 5 to 7D illustrate another embodiment of the present invention,

FIG. 5 illustrates a perspective view showing a pressure reducing strip drip according to the present invention;

FIG. 6 illustrates an enlarged plan view of a portion shown in FIG. 5;

FIGS. 7A to 7D illustrate exemplary diagrams for explaining respective steps of the present invention, FIG. 7A illustrates a cross-sectional view showing a first step of the present invention;

FIG. 7B illustrates a cross-sectional view showing a second step of the present invention;

FIGS. 7C and 7D illustrate cross-sectional views showing a third step of the present invention;

DETAILED DESCRIPTION OF THE PREFERRED EMBODIMENTS

Hereinafter, an emitting pipe boring method according to the present invention will be described in detail with reference to the accompanying drawings.

Figure 1:
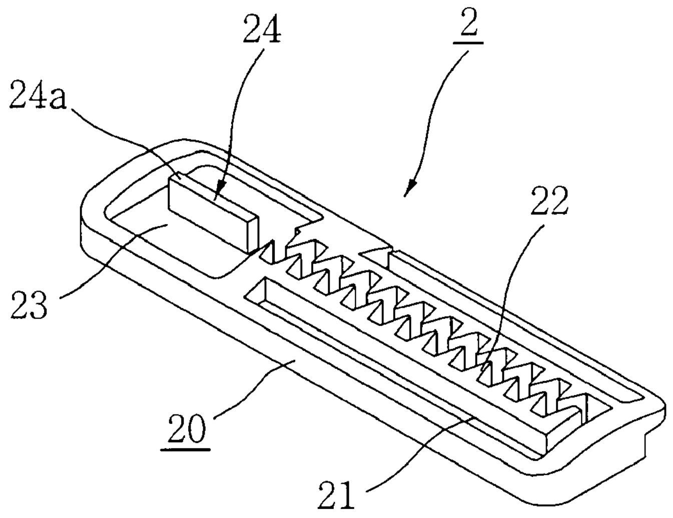
FIGS. 1 to 4 illustrate one embodiment of the present invention.

FIGS. 1 to 4 illustrate one embodiment of the present invention. FIG. 1 illustrates a perspective view of a drip at a first step of the present invention.

Similarly to a general drip, the pressure reducing drip 2 is adhered to the inside of a drip pressure reducing hose to be spaced from another drip. The pressure reducing drip 2 is configured as one drip body 20 which includes the introducing portion 21 for introducing water, the pressure reducing portion 22 for reducing the pressure of the introduced water and the discharging portion 23 for discharging the water with a reduced pressure to the outside.

In the pressure reducing drip 2, at the first step of the present invention, an upward projection 24 is formed to be higher than a height of the drip body 20 at a central portion of the discharging portion 23 to determine a position of the ejection hole of the drip pressure reducing hose. Accordingly, the ejection hole of the drip pressure reducing hose can be punched at the position by a boring apparatus without an additional detecting sensor.

Figure 2:
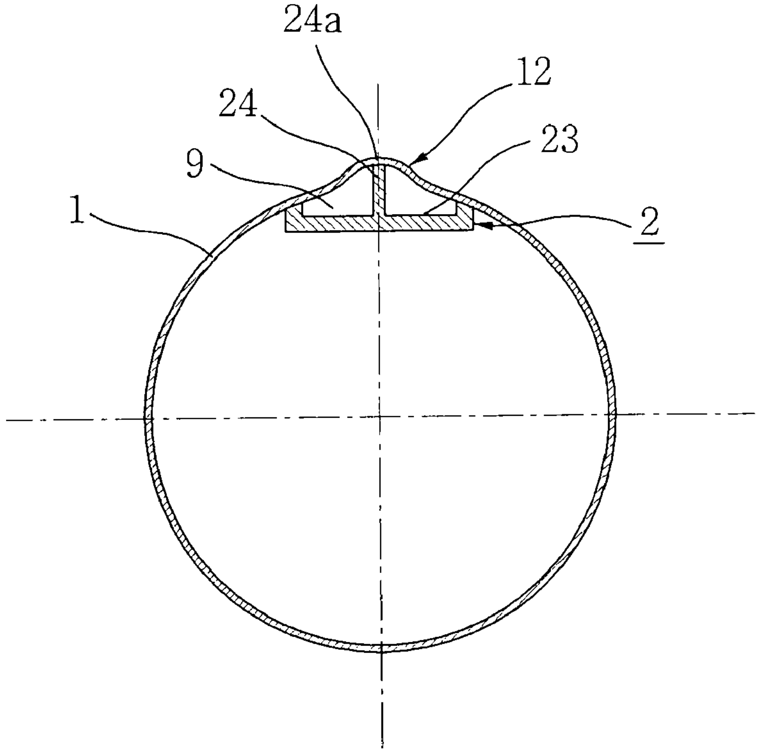

FIG. 2 illustrates a cross-sectional view showing a second step of the present invention.

As shown in FIG. 2, the pressure reducing drip 2 having the upward projection 24 is adhered to the inside of the drip pressure reducing hose 1. Accordingly, a protruding portion 12 is formed on the drip pressure reducing hose 1 by the upward projection 24 of the drip.

The process of adhering the pressure reducing drip 2 onto the drip pressure reducing hose 1 is performed by the above-described emitting pipe manufacturing apparatus. The pressure reducing drip 2 is supplied toward the drip pressure reducing hose molding unit 3 by the drip supply unit 4 to be spaced from another drip and is adhered to the inside of the drip pressure reducing hose 1. In a conventional case, drip supplying intervals at which drips are supplied to the drip pressure reducing hose molding unit 3 should be accurately set. However, at the first step of the present invention, a position of punching an ejection hole 11 of the drip pressure reducing hose is determined by the upward projection 24 formed on the discharging portion 23 of the pressure reducing drip 2 and the protruding portion 12 of the drip pressure reducing hose 1. Accordingly, there is no need to accurately set an interval between drips.

Figure 3:
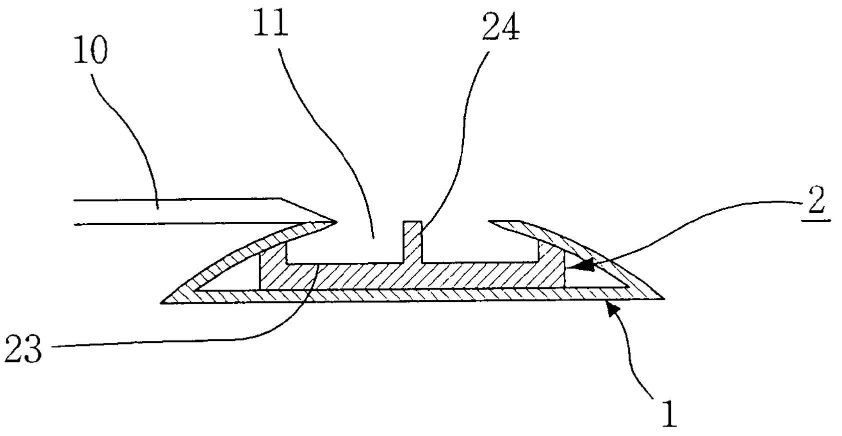

FIG. 3 illustrates a cross-sectional view showing a third step of the present invention.

Figure 4:
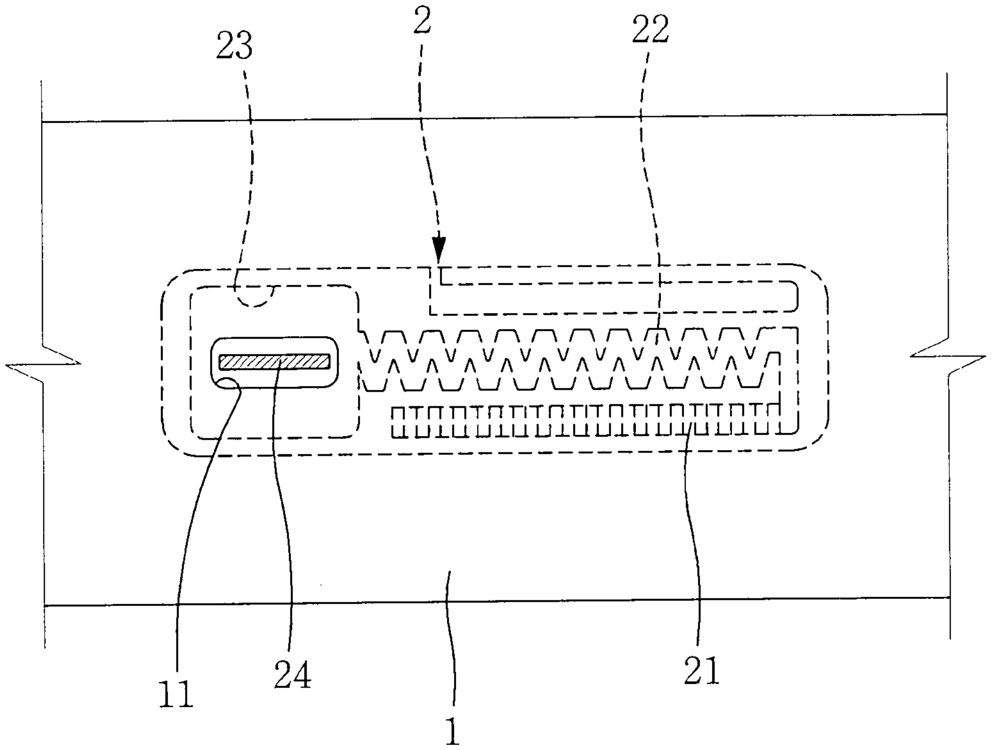

At the third step, the protruding portion 12 formed on the drip pressure reducing hose 1, that is, the upward projection 24 of the pressure reducing drip 2, and the drip pressure reducing hose 1 disposed on the upward projection 24 are cut together in a horizontal direction. Accordingly, as shown in FIG. 4, the ejection hole 11 of the drip pressure reducing hose is accurately punched above the discharging portion of the pressure reducing drip 2.

Thus, the present invention enables a simple and easy operation without difficulty in the operation of the conventional emitting pipe boring apparatus including the drip projection detecting unit and the rotation punch, wherein the ejection hole is formed on the drip pressure reducing hose while accurately setting a circumferential distance between punches, a distance between the drip projection detecting unit and the rotation punch and a moving velocity of the drip pressure reducing hose. Further, since a boring operation is performed in a state where the position of the ejection hole is determined in advance by the upward projection of the discharging portion formed on the drip, it is possible to ensure accuracy of a boring position and minimize a material loss due to almost no defect.

Figure 5:
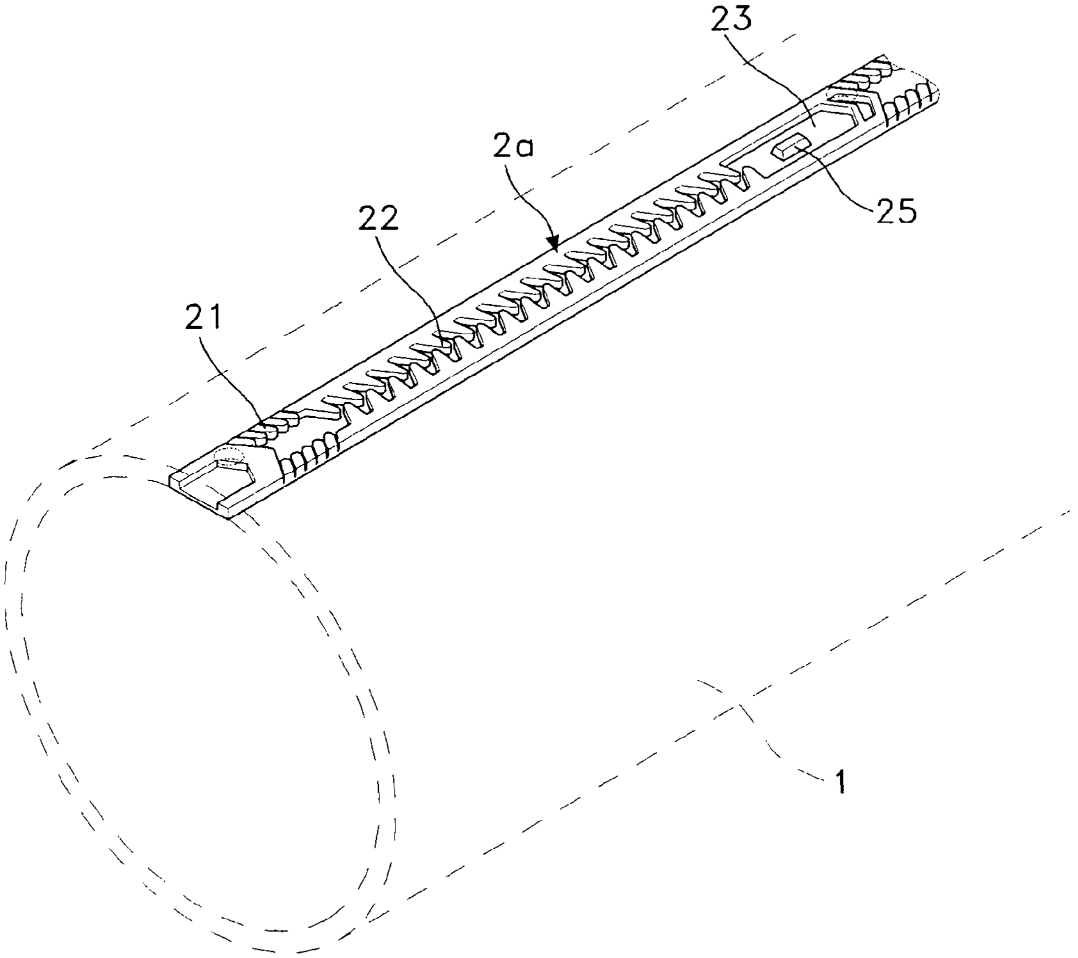

Meanwhile, in addition to the pressure reducing drip 2, a pressure reducing strip drip 2*a* shown in FIG. 5 may be used. As known well, the pressure reducing strip drip 2*a* has a structure in which respective groups each consisting of the introducing portion 21, the pressure reducing portion 22 and the discharging portion 23 are successively formed on a strip-shaped drip body 20*a*.

Further, the interference between the protruding portion 12 formed on the drip pressure reducing hose 1 and the upper and lower drawing rolls 60 and 60*a* can be eliminated by forming a groove on the upper drawing roll 60.

Figure 6:
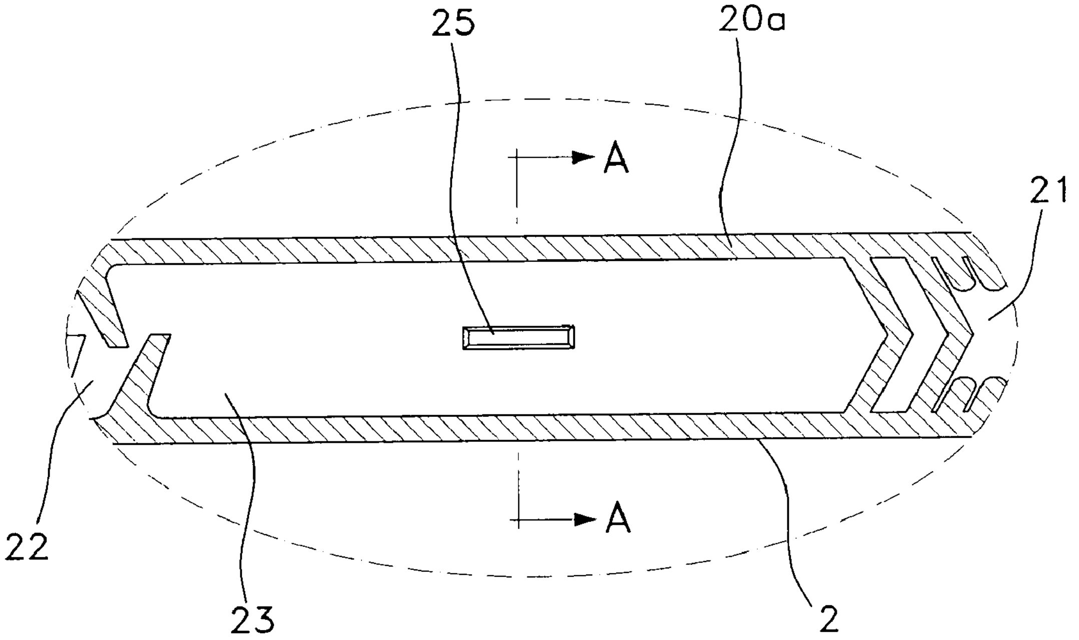

FIGS. 5 to 7D illustrate another embodiment of the present invention. FIG. 5 illustrates a perspective view of a pressure reducing strip drip according to the present invention. FIG. 6 illustrates an enlarged plan view of a portion shown in FIG. 5, and FIG. 7A illustrates a cross-sectional view taken along a line A-A of FIG. 6.

As shown in the drawings, at a first step of the present invention, an upper projection 25 having the same height as the drip body 20*a* of the pressure reducing strip drip 2*a* and a lower projection 26 of the lower side of the upper projection 25 are formed as a single body at the discharging portion 23 of the pressure reducing strip drip 2*a*.

In this case, although the shape or structure of the upper and lower projection 25 and 26 is not very important, it is preferable that the upper and lower projection 25 and 26 have a decreasing width toward an end portion thereof, that is, the upper side of the upper projection and the lower side of the lower projection, in the aspect of concentration of force or facilitation of cutting. However, since the end portion is also adhered to the inside of the drip pressure reducing hose 1, it should be considered that the end portion has a certain adhesion area.

Figure 7A:
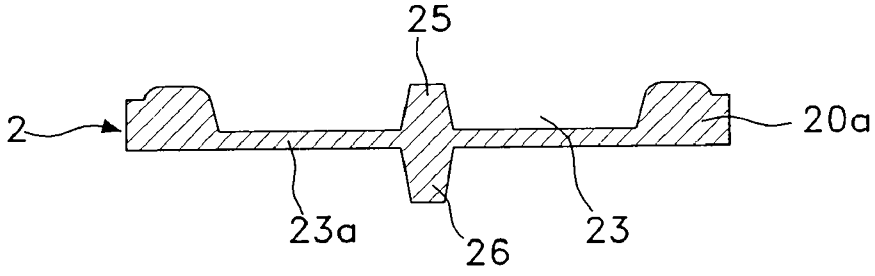
Figure 7B:
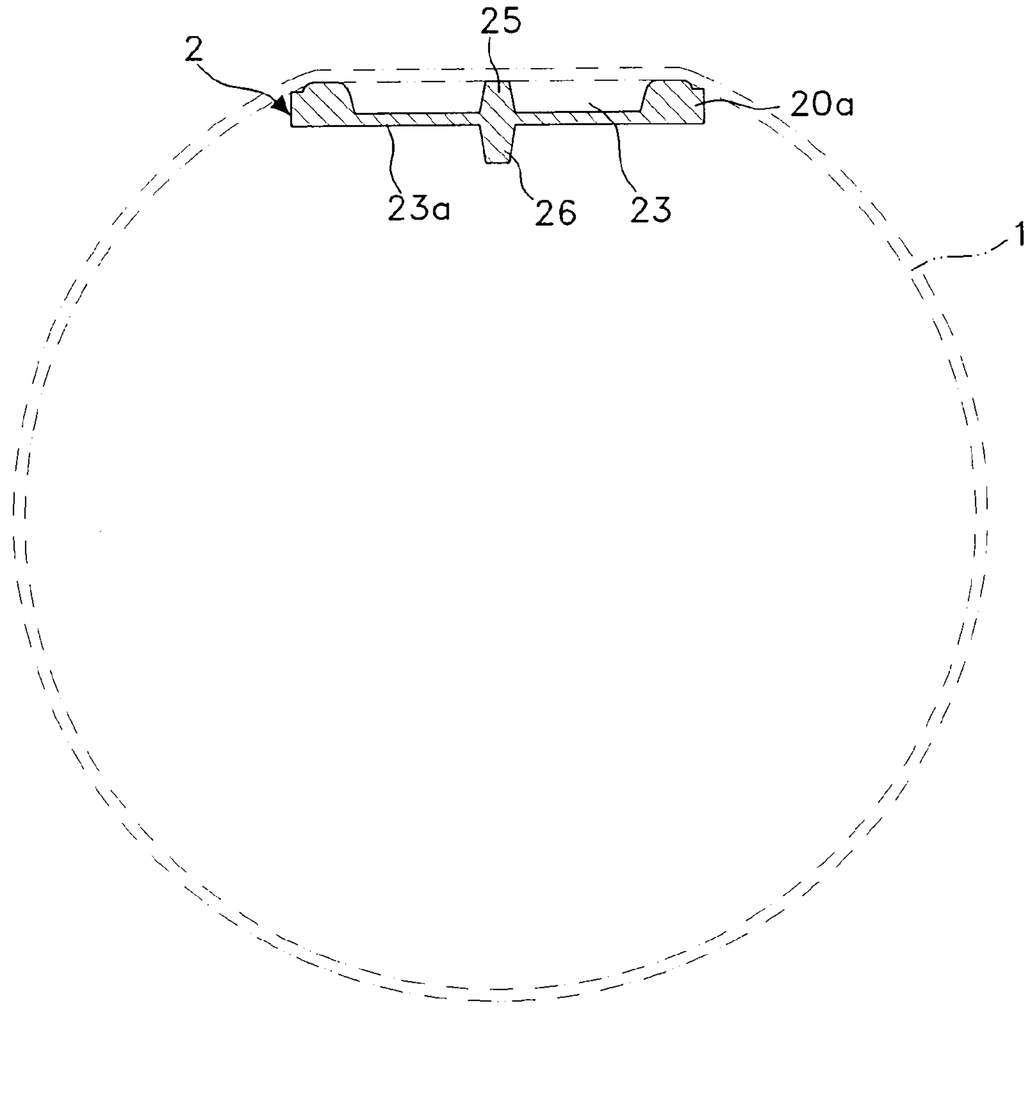

FIG. 7B illustrates a cross-sectional view showing a second step of the present invention.

At the second step, the pressure reducing strip drip 2*a* is adhered to the inside of the drip pressure reducing hose 1 in the same way as in a general case. In this embodiment, since the upper projection 25 having the same height as the pressure reducing strip drip 2*a* and the lower projection 26 of the lower side of the upper projection 25 are formed at the discharging portion 23 of the pressure reducing strip drip 2*a*, the upper projection 25 is also adhered to the inside of the drip pressure reducing hose 1.

Then, the drip pressure reducing hose 1 passes between the upper and lower drawing rolls 60 and 60*a* forming the first and second drawing portions of the emitting pipe manufacturing apparatus. Accordingly, while the passage of the drip pressure reducing hose is narrowed vertically, upper and lower portions of the drip pressure reducing hose overlap with each other. In this case, a lower surface 13 of the drip pressure reducing hose which is supported by the lower drawing roll 60*a* pushes the lower projection 26 upward to move the upper projection 25 upward. Accordingly, the protruding portion 12 is formed on the drip pressure reducing hose 1. Reference numeral 23*a* denotes a bottom surface of the discharging portion of the drip.

Figure 7C:
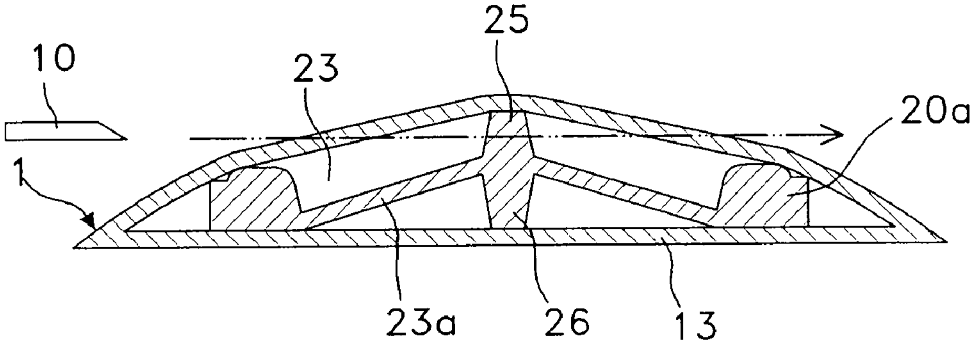
Figure 7D:
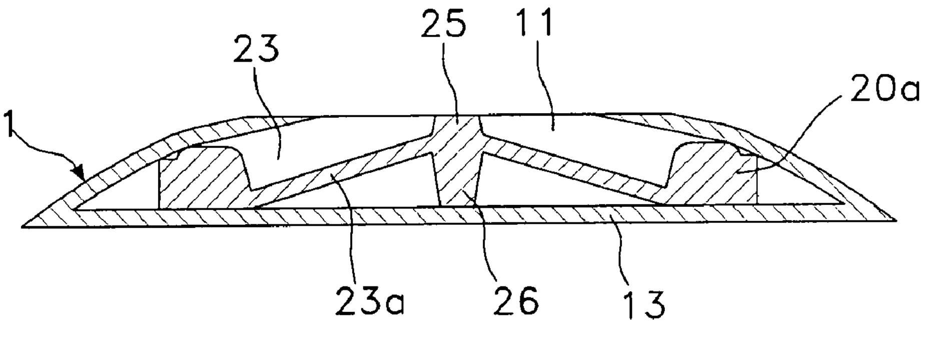
Figure 8:
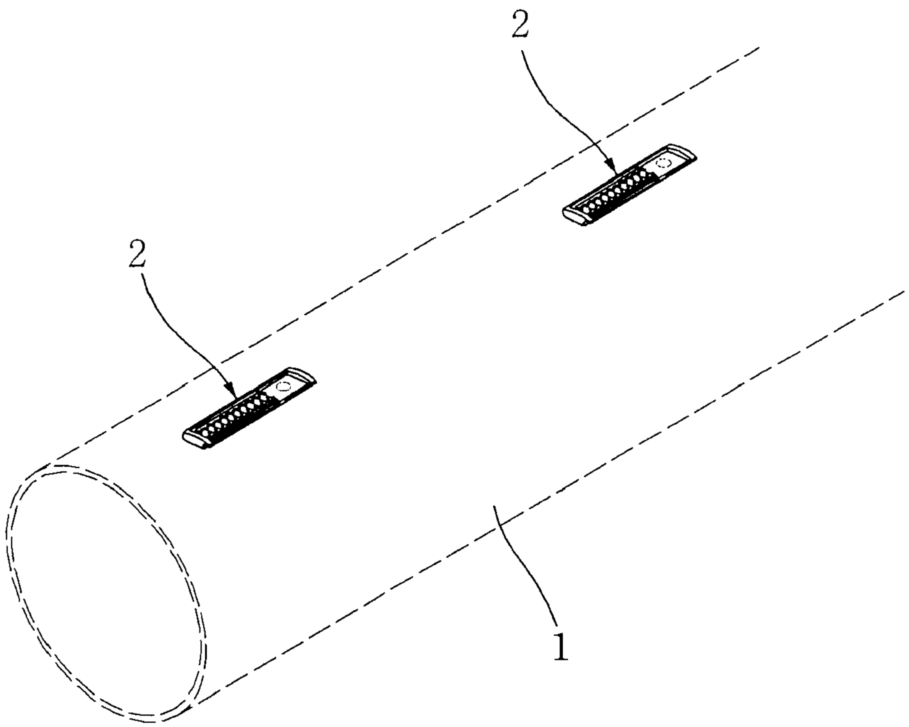
Fig.8 Prior Art
FIG. 8 illustrates a perspective view showing a general emitting pipe.
Figure 9:
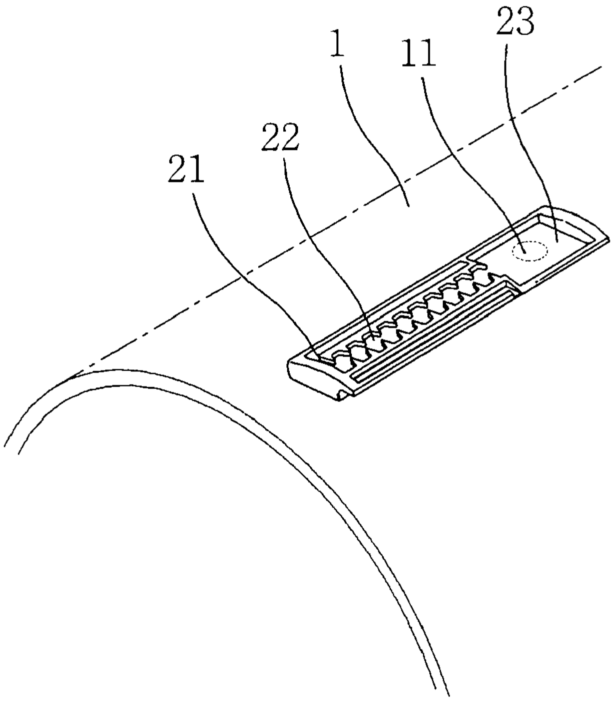
Fig.9 Prior Art
FIG. 9 illustrates a perspective view showing a structure of a drip shown in FIG. 8.
Figure 10:
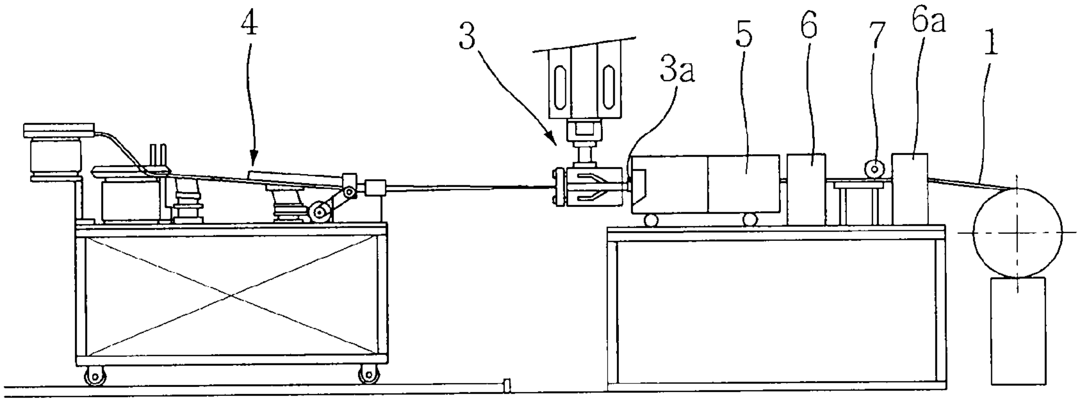
Fig.10 Prior Art
FIG. 10 illustrates a front view showing a general emitting pipe manufacturing apparatus.
Figure 11:
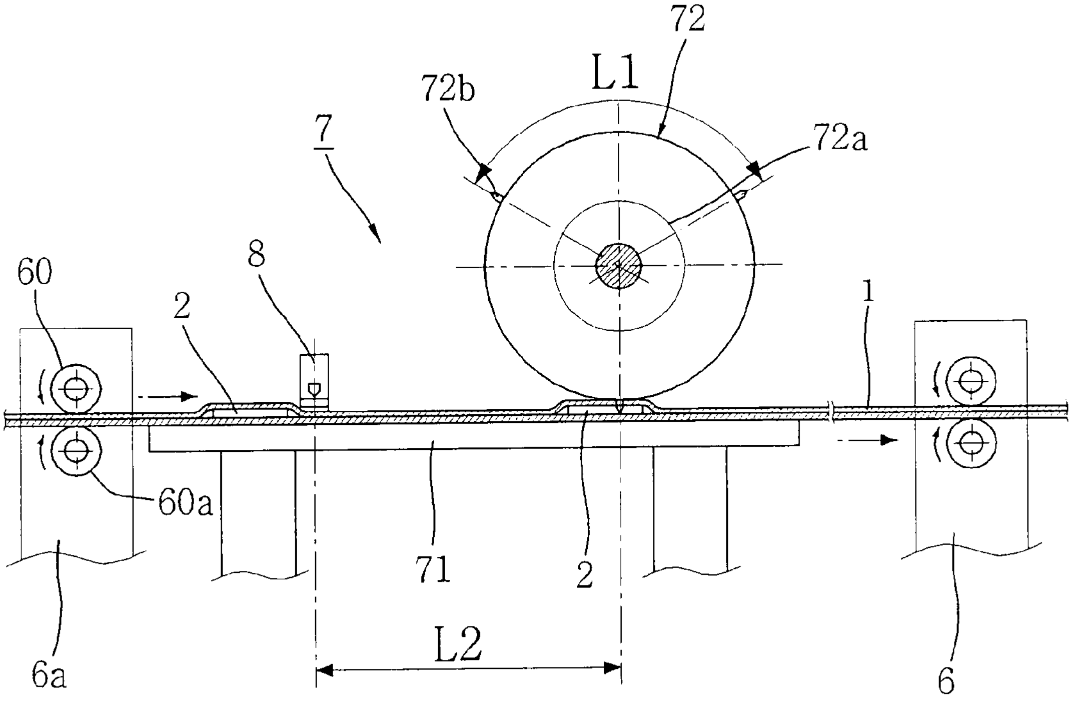
Fig.11 Prior Art
FIG. 11 illustrates a cross-sectional view showing a conventional emitting pipe boring apparatus.

FIGS. 7C and 7D illustrate cross-sectional views showing a third step of the present invention.

At the third step, the protruding portion 12 formed on the drip pressure reducing hose 1 at the second step, that is, the upward projection 25 of the pressure reducing drip 2 and the drip pressure reducing hose 1 disposed on the upward projection 25 are cut together in a horizontal direction. Accordingly, as shown in FIG. 7D, the ejection hole 11 of the drip pressure reducing hose is accurately formed above the discharging portion of the pressure reducing drip 2.

Meanwhile, in addition to the pressure reducing strip drip 2*a*, this embodiment may be applied to the pressure reducing drip 2 configured as one drip body 20 including the introducing portion 21, the pressure reducing portion 22 and the discharging portion 23 as shown in FIG. 1.

Further, the interference between the protruding portion 12 formed on the drip pressure reducing hose 1 and an adhesion roll (not shown) and the upper and lower drawing rolls 60 and 60*a* in the drip pressure reducing hose molding unit 3 can be eliminated by forming a groove on the adhesion roll and the upper drawing roll.

Further, as known well, the pressure reducing strip drip 2*a* has a structure in which respective groups each consisting of the introducing portion 21, the pressure reducing portion 22 and the discharging portion 23 are successively formed on the strip-shaped drip body 20*a*. Also in this case, it is unnecessary to supply drips to the drip pressure reducing hose molding unit of the emitting pipe manufacturing apparatus while accurately setting an interval between the pressure reducing drips as in conventional pressure reducing drips. That is, it is possible to form an ejection hole at an accurate position of the drip pressure reducing hose only by successively supplying the pressure reducing strip drip toward the drip pressure reducing hose molding unit of the apparatus.

Also in a case of the pressure reducing strip drip, a fine variation in a length may be generated due to a pulling force of the drawing rolls during the transfer or since the pressure reducing strip drip is adhered and hardened on the inner surface of the drip pressure reducing hose. Resultantly, a large length variation may be generated due to a cumulative variation. According to the present invention, the ejection hole of the drip pressure reducing hose can be accurately formed on the discharging portion of the pressure reducing strip drip regardless of a length variation of the pressure reducing strip drip.

As described above, according to the present invention, the projection is formed on the discharging portion of the pressure reducing drip and the protruding portion is formed on the drip pressure reducing hose. Then, the upper portion of the protruding portion is cut horizontally to form the ejection hole on the discharging portion of the pressure reducing drip. Accordingly, it is possible to easily and simply bore the ejection hole of the drip pressure reducing hose on the discharging portion of the pressure reducing drip without difficulty and trouble in an operation for accurately setting an interval between the pressure reducing drips, a transfer velocity of the drip pressure reducing hose and a rotational velocity of a punch wheel. Therefore, there are effects of improving efficiency and productivity of the manufacture of the emitting pipe without defects and ensuring economical efficiency.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for forming an ejection hole on a drip pressure reducing hose above a discharging portion of at least one drip which is adhered to an inside of the drip pressure reducing hose and includes an introducing portion, a pressure reducing portion and a discharging portion, the method comprising:

forming an upper projection having the same height as the drip and a lower projection of a lower side of the upper projection at the discharging portion of the drip;

forming a protruding portion on the drip pressure reducing hose by the upper projection by adhering the drip having the upper and lower projections to the inside of the drip pressure reducing hose, and moving the lower projection upward due to a lower surface of the drip pressure reducing hose supported by the lower drawing roll when upper and lower portions of the drip pressure reducing hose overlap with each other while the passage of the drip pressure reducing hose is narrowed vertically as the drip pressure reducing hose passes between the upper and lower drawing rolls; and forming an ejection hole of the drip pressure reducing hose by horizontally cutting an upper portion of the protruding portion formed on the drip pressure reducing hose.

2. The method according to claim 1, wherein the drip is configured as one drip body including the introducing portion, the pressure reducing portion and the discharging portion and includes a number of drips which are adhered to the inside of the drip pressure reducing hose with a specified space between the drips.

3. The method according to claim 1, wherein the drip is configured as a pressure reducing strip drip in which respective groups each consisting of the introducing portion, the pressure reducing portion and the discharging portion are successively formed on a strip-shaped drip body to be adhered to the inside of the drip pressure reducing hose.

* * * * *